(12) United States Patent
Rudolph et al.

(10) Patent No.: US 11,900,342 B2
(45) Date of Patent: Feb. 13, 2024

(54) COMPUTER-IMPLEMENTED CONTROL SYSTEMS AND METHODS FOR DATA ALLOCATING OF A PLURALITY OF SHARING DATABASE FILES

(71) Applicant: Samaritan Ministries International, Peoria, IL (US)

(72) Inventors: Bryan Rudolph, East Peoria, IL (US); David Allen Eskridge, Peoria, IL (US); Travis Unruh, Washington, IL (US); Seth A. Ben-Ezra, Peoria, IL (US); Jared Rauh, Dunlap, IL (US); Brian Phillips, Peoria, IL (US); Chad Fleck, Eureka, IL (US); Austin Knobloch, Peoria, IL (US); Wayne Black, Normal, IL (US); Ben Bolen, Peoria Heights, IL (US)

(73) Assignee: Samaritan Ministries International, Peoria, IL (US)

( * ) Notice: Subject to any disclaimer, the term of this patent is extended or adjusted under 35 U.S.C. 154(b) by 0 days.

(21) Appl. No.: 17/758,862

(22) PCT Filed: Jan. 13, 2021

(86) PCT No.: PCT/US2021/070028
§ 371 (c)(1),
(2) Date: Jul. 14, 2022

(87) PCT Pub. No.: WO2021/146752
PCT Pub. Date: Jul. 22, 2021

(65) Prior Publication Data
US 2022/0405724 A1    Dec. 22, 2022

Related U.S. Application Data

(60) Provisional application No. 62/960,978, filed on Jan. 14, 2020.

(51) Int. Cl.
*G06Q 20/10* (2012.01)
*G06Q 20/14* (2012.01)
*G06Q 30/04* (2012.01)

(52) U.S. Cl.
CPC .......... *G06Q 20/102* (2013.01); *G06Q 20/14* (2013.01)

(58) Field of Classification Search
None
See application file for complete search history.

(56) References Cited

U.S. PATENT DOCUMENTS

| 7,447,659 B2 | 11/2008 | Parthasarathy |
| 7,716,125 B2 | 5/2010 | Shavit et al. |

(Continued)

FOREIGN PATENT DOCUMENTS

| CA | 2828144 A1 | 3/2015 |
| KR | 20030043200 A | 6/2003 |

(Continued)

OTHER PUBLICATIONS

Altrua Healthshare, Altrua Healthshare Membership Guidelines, Jan. 2, 2018, 56 pages, Altrua Healthshare, Austin, Texas, United States.

(Continued)

*Primary Examiner* — Joseph W. King
(74) *Attorney, Agent, or Firm* — Coughlin Law Office, LLC; Daniel J. Coughlin; Stuart M. Aller

(57) ABSTRACT

A computer-implemented control system and method for data allocating of a plurality of sharing database files having share amounts based on a plurality of requests from a plurality of receiving devices of a direct sharing network and method for displaying and initiating transfer according to the allocating component. A display device and user input device displays sending elements, receiving elements, and (Continued)

share components in a location-specific manner. The allocating component determines the allocating of shares between the plurality of user sending devices to the plurality of user receiving devices. Allocating may proceed in an iterative process using multiple steps, over different time frames, for increasing the speed of sharing through the direct sharing network. The allocating component may prioritize bundling transfers from multiple sharing devices and an unsharable portion from the receiving device to reduce transfers through the direct sharing network and more quickly generate a balance amount equal to the receiving item request from the receiving device.

15 Claims, 7 Drawing Sheets

(56) References Cited

U.S. PATENT DOCUMENTS

| | | | |
|---|---|---|---|
| 8,359,264 | B2 | 1/2013 | Peterson et al. |
| 8,527,415 | B2 | 9/2013 | Blythe |
| 8,666,775 | B2 | 3/2014 | Francis et al. |
| 8,676,674 | B2 | 3/2014 | Perlman |
| 9,965,808 | B1* | 5/2018 | Kunz ................ G06Q 40/12 |
| 9,978,087 | B2 | 5/2018 | Friedholm et al. |
| 10,019,597 | B2 | 7/2018 | Barday |
| 10,566,090 | B2 | 2/2020 | Ivanoff et al. |
| 10,621,574 | B1 | 4/2020 | Rao |
| 2006/0173778 | A1 | 8/2006 | Lipsky et al. |
| 2006/0224502 | A1 | 10/2006 | McGowan |
| 2008/0052224 | A1 | 2/2008 | Parker |
| 2010/0121745 | A1 | 5/2010 | Teckchandani et al. |
| 2010/0205096 | A1 | 8/2010 | Meggs |
| 2011/0047070 | A1 | 2/2011 | Farias |
| 2011/0246342 | A1 | 10/2011 | Gibson et al. |
| 2011/0282793 | A1 | 11/2011 | Mercuri et al. |
| 2012/0239417 | A1 | 9/2012 | Pourfallah et al. |
| 2013/0013494 | A1 | 1/2013 | Perlman |
| 2015/0262111 | A1 | 9/2015 | Yu et al. |
| 2016/0196397 | A1 | 7/2016 | Avganim |
| 2018/0197167 | A1 | 7/2018 | Ganesan |
| 2019/0180239 | A1 | 6/2019 | Fabris et al. |
| 2019/0180359 | A1 | 6/2019 | Fabris et al. |
| 2019/0180360 | A1 | 6/2019 | Fabris et al. |
| 2019/0180361 | A1 | 6/2019 | Fabris et al. |
| 2019/0180362 | A1 | 6/2019 | Fabris et al. |
| 2019/0180363 | A1 | 6/2019 | Fabris et al. |
| 2020/0364805 | A1 | 11/2020 | Riese |
| 2020/0372554 | A1* | 11/2020 | Meggs ................ G06Q 50/01 |
| 2021/0174402 | A1 | 6/2021 | Barakat et al. |

FOREIGN PATENT DOCUMENTS

| | | |
|---|---|---|
| KR | 20180052839 A | 5/2018 |
| WO | 2019118683 A1 | 6/2019 |
| WO | 2021146752 A1 | 7/2021 |

OTHER PUBLICATIONS

Department of the Treasury Internal Revenue Service, Form 990, Return of Organization Exempt From Income Tax, Samaritan Ministries, Year 2016 dated Apr. 26, 2018, 65 pages, United States.

Hyung Jae Kim, et al., Method for Operating Mutual-Aid Group based on Crowd Funding, May 21, 2018, 18 pages, This is a machine translated text of a patent application originally published on May 21, 2018, Korea.

Monteverde, et al., Integration interface for funds transfer service processes, and collection services at the service of the sustainable development of community and participatory credit between individuals, Published Mar. 25, 2015, 25 pages, This is a machine translated text of a patent originally published on Mar. 25, 2015, Canada.

Our Thought Leaders, Why Now Is the Time for Healthcare to Tap the Sharing Economy, Jun. 22, 2017, 11 pages, HIT Consultant Media, United States.

Park Sang Kyu, Method for group buying via mutual aid group over network, Jun. 2, 2003, 9 pages, This is a machine translated text of a patent originally published on Jun. 2, 2003, Korea.

Park, Hye Lyun, International Search Report, dated May 6, 2021, 3 pages, Korean Intellectual Property Office, Korea.

Poyaoan, Jassmin, How Lending Circles & Mutual Aid Groups Create Community Resilience, Economy, Aug. 26, 2013, 16 pages, Post Carbon Institute, United States.

Turner, There's a Christian Alternative to Health Insurance, But It's Not for Everyone, Jun. 1, 2017, 39 pages, BuzzFeed, San Francisco, California, United States.

Wealthy Smith, Welcome to Welcome Wealthy Family, My 365, Published at least as early as Dec. 7, 2018, 4 pages.

* cited by examiner

COMPUTER-IMPLEMENTED CONTROL SYSTEMS AND METHODS FOR DATA ALLOCATING OF A PLURALITY OF SHARING DATABASE FILES

CROSS REFERENCES

This application claims priority of U.S. Provisional Application No. 62/960,978 filed on 14 Jan. 2020.

TECHNICAL FIELD

The present disclosure relates to generating online share slips with clickable web links for electronic share transfers for preferentially matched members with e-service capabilities, enabling an increased number of members in a peer-to-peer health care needs sharing organization to engage in electronic share transfers.

BACKGROUND

Health care sharing is an alternative to health care insurance products. Health care sharing is a type of a mutual benefit society where members commit to sharing in a portion of the medical needs of the other members. An organization can take an active role in receiving and disbursing the funds or a more passive role by providing share information to the members to engage in a peer-to-peer direct sharing model.

In a health care sharing model, generally, a member pays a share on a periodic basis, commonly monthly. When a member has a qualifying health care expense, the member may submit that expense for reimbursement by the ministry or directly from other members. The health care sharing organization directs one or more other members to meet that need, either directly or through the health care sharing organization. The need can be met by the other members directly, in a peer-to-peer direct sharing model, or indirectly where the members send their share money to the health care sharing organization to collectively pool and distribute to the member in need.

SUMMARY

A peer-to-peer direct sharing system is disclosed. The direct sharing system includes an allocation component. The allocation component assigns a first share portion from a first share associated with a first member to a medical expense associated with a second member. A display device displays a sender element and a recipient element. A user input device activates a share approval component for initiating a peer-to-peer transfer of funds based on the first share portion. The first member may be required to interact with the share approval component to transfer funds based on the first share portion to the second member, without entering the first share portion or identifying information related to the second member.

We also disclose a method for peer-to-peer direct sharing of medical expenses between members of a health care sharing organization. A first share portion is assigned to a first medical expense bill. The first share portion is associated with a sending member and the first medical expense bill is associated with a receiving member. A sender element and a recipient element are displayed in a geographically representative manner. An approval signal is sent upon a user moving a share transfer element from the sender element to a share approval region about the recipient element. The user may be the sending member.

We also disclose another method for peer-to-peer direct sharing of medical expenses between members of a health care sharing organization. A plurality of medical expense bills is received on behalf of a plurality of receiving members. A first medical expense bill and a second medical bill are associated with a first receiving member. The plurality of medical expense bills are loaded into a bills queue. Share amounts for each of the plurality of sending members are loaded into a shares analysis queue. Starting with the shares analysis queue and the bills queue, an iterative process begins. First, the first medical expense bill is selected from the bills queue. Then, a selected share is selected from the shares analysis queue. Then, the selected share is assigned to the first medical expense bill submitted by the first receiving member. If the share amount of the selected share exceeds a first need amount of the first medical expense bill, then the selected share is assigned to the second medical expense bill submitted by the first receiving member. These substeps are performed in an iterative manner until the earlier of (A) the share amount of the selected share is fully applied or (B) any of the plurality of medical expense bills that were submitted by the first receiving member have been satisfied. The first medical expense bill may be related to medical care provided to a first person of a member and the second medical expense bill relates to medical care provided to a second person of a member. In this case, members may be considered households or immediate families, where multiple individuals are considered one member.

We also disclose a method for peer-to-peer direct sharing of medical expenses between members of a health care sharing organization. A plurality of share amounts corresponding to a plurality of members are loaded into a shares analysis queue. A first medical expense bill is received on behalf of a receiving member of the plurality of members. A sharable amount may be less than the first medical expense bill. In this situation, a remainder amount that corresponds to the difference between the first medical expense bill and the sharable amount is determined, which may correspond to the receiving member's annual unshareable amount or some other receiving member responsibility. A first set of the plurality of share amounts from the shares analysis queue is allocated to the first medical expense bill. The sum of the first set of the plurality of share amounts is equal to the sharable amount. The first set of the plurality of share amounts is received into a virtual bill account. A payment of funds for the first medical expense bill is made from the sharable amount in the virtual bill account and the remainder amount from a second source. The second source may be a bank account from which the receiving member has authority to initiate an electronic funds withdrawal. The virtual bill account may be owned by the receiving member. The payment of funds may occur without member interaction after a period of time after the plurality of share amounts are received into the virtual bill account. The receiving member may prevent the payment of funds within the period of time.

We also disclose another method for peer-to-peer direct sharing of expenses between members of a sharing organization. A first share amount from a first sending member is assigned to a first bill. A sending member may be required to interact with a share approval component before transferring funds from a sending member to a receiving member. The first sending member is reassigned to a second recipient if the sending member fails to interact with the share approval component within six days. The allocation may be dependent on the first bill being the oldest in a bills queue where the share amount is at least 65% of the first bill. If the sending member fails to interact with the share approval component within six days, then a subsequent share from the sending member may be assigned to a super member wallet that does not require member approval in order to transfer funds to a receiving member.

Allocation of a plurality of shares in a share queue to a plurality of bills in a bills queue may be performed as follows. First, funds from the super member wallet are allocated to a plurality of priority medical expense bills. Second, shares from the shares queue that are associated with sending members having a fastest speed sharing ratings may be allocated to bills in the bills queue in order of an oldest bills to a most recent bill. Then, any remaining shares from the share queue are allocated to outstanding bills from the bills queue in order of an oldest bills to a most recent bill. Refunds from providers may be received into the super member wallet. The plurality of priority medical expense bills can be those bills that were not fully funded during a previous allocation or may be those bills that received discounts based on timely payment.

In systems where the sending member interacts with a share approval component, a time that it takes for the sending member to interact with the share approval component may be calculated. That time may be displayed as a share speed rating. The member may also be rewarded for having quicker time ratings.

We also disclose a method for making a single payment to a medical service provider that resolves an outstanding balance of the first medical bill. A plurality of payments of funds are received into a bill account from a plurality of members of a health care sharing organization. A non-sharable payment of funds is made from a receiving member who submitted the first medical bill. A single payment is made to a medical service provider that resolves an outstanding balance of the first medical bill from the funds contributed by the plurality of members of the health care sharing organization and the funds from the receiving member.

The first medical expense bill may relate to medical care provided to a first person of a member and the second medical expense bill relates to medical care provided to a second person of the same member.

We also disclose another method of peer-to-peer direct sharing of expenses between a plurality of members of a sharing organization. A plurality of bills are loaded into a bills queue. The bills have a date and a bill amount. A share amount for a plurality of sending members is loaded into a shares queue. A selected share is selected from the shares analysis queue. The selected share has a selected share amount. The selected share is assigned to a first medical expense bill that has an oldest date in the bills queue where the selected share amount is at least 65% of a first bill amount of the first medical expense bill.

A total bill amount can be calculated from the bills queue. A total wallet amount can be calculated from a wallets-available database. A first share amount can then be calculated based on a first wallet balance associated with a first sending member. This first share amount is calculated by multiplying the first wallet balance times the total wallet amount divided by the total bill amount. The plurality of bills in the bill queue can be repriced based on a fair billing price prior to calculating the total bill amount. A first set of members can be designated for assigning and sharing in a first week of the month. A second set of members can be designated for assigning of shares and sharing in a second week of the month. A secondary recipient may be assigned to receive not more than 35% of the share amount. A name of a receiving member associated with the first medical expense bill can be displayed as the recipient on the display device, and the secondary recipient may or may not be displayed.

The above advantages and features are of representative embodiments only, and are presented only to assist in understanding the invention. It should be understood that they are not to be considered limitations on the invention as defined by the claims. Additional features and advantages of embodiments of the invention will become apparent in the following description, from the drawings, and from the claims.

BRIEF DESCRIPTION OF THE DRAWINGS

Aspects are illustrated by way of example, and not by way of limitation, in the accompanying drawings, wherein.

DESCRIPTION OF EMBODIMENTS

Figure 1:
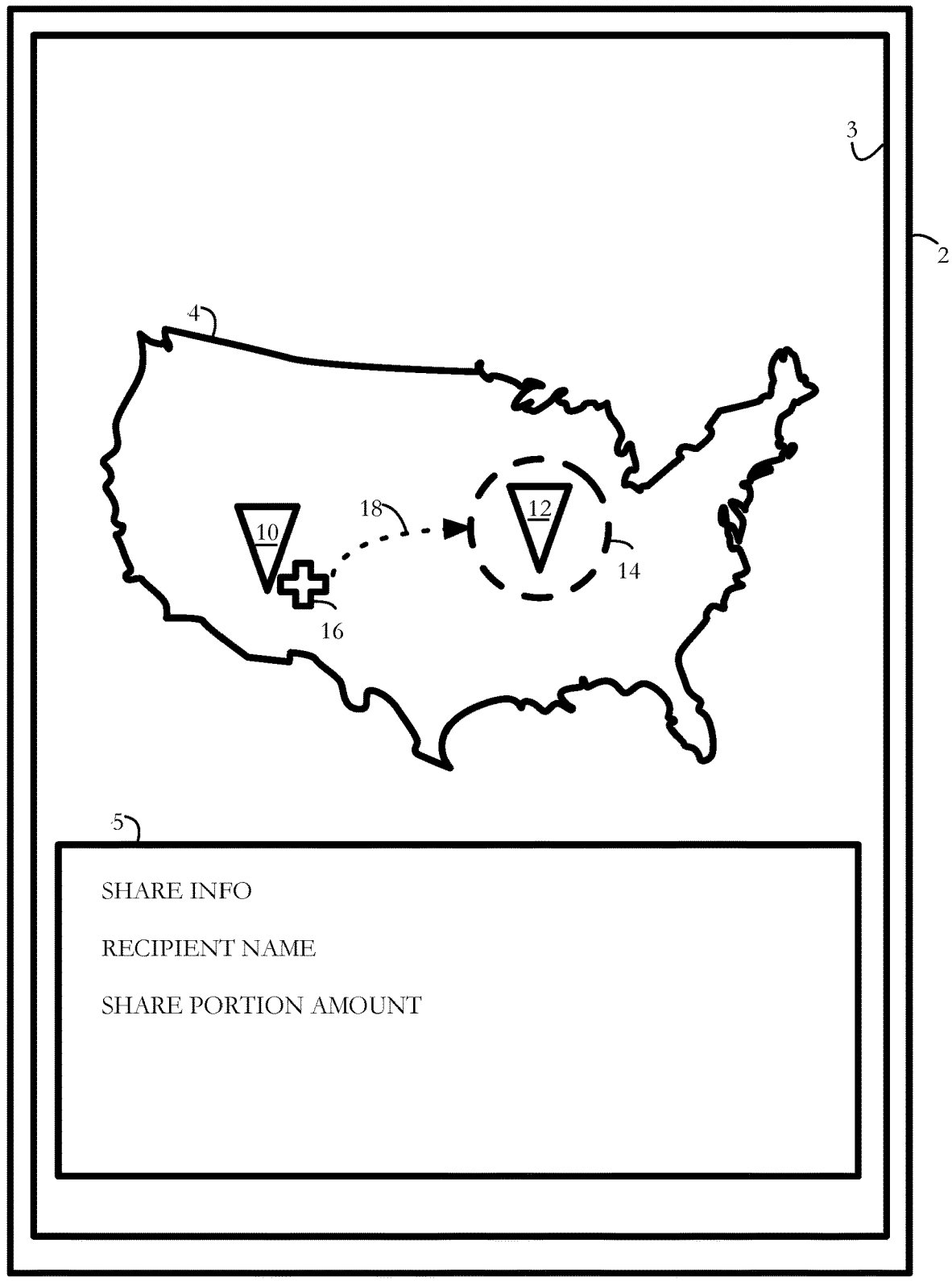
FIG. 1 depicts an example of a display device and user interface for participating in the peer-to-peer sharing of medical expenses between members of a health care sharing ministry.

A health care sharing organization can emphasize the community qualities of a mutual society with a direct sharing system for the peer-to-peer sharing of their medical expenses between the members. FIG. 1 shows an interface for a user, such as a member, to interact with a health care sharing community. Members of a health care sharing community send and receive funds when another member incurs a qualified medical expense. A method 200 for sharing with members in a direct sharing system comprises an allocation component is shown as a flow chart in FIG. 2. The allocation component is configured to assign a first share portion from a first share associated with a first member to a medical expense associated with a second member of the peer-to-peer direct-sharing community, as shown in step 202.

A display device 3 displays a sender element 10 and a recipient element 12. The sender element 10 and the recipient element 12 can be a generic graphic, as shown in FIG. 1, or can be a personalized image of the respective member.

Figure 2:
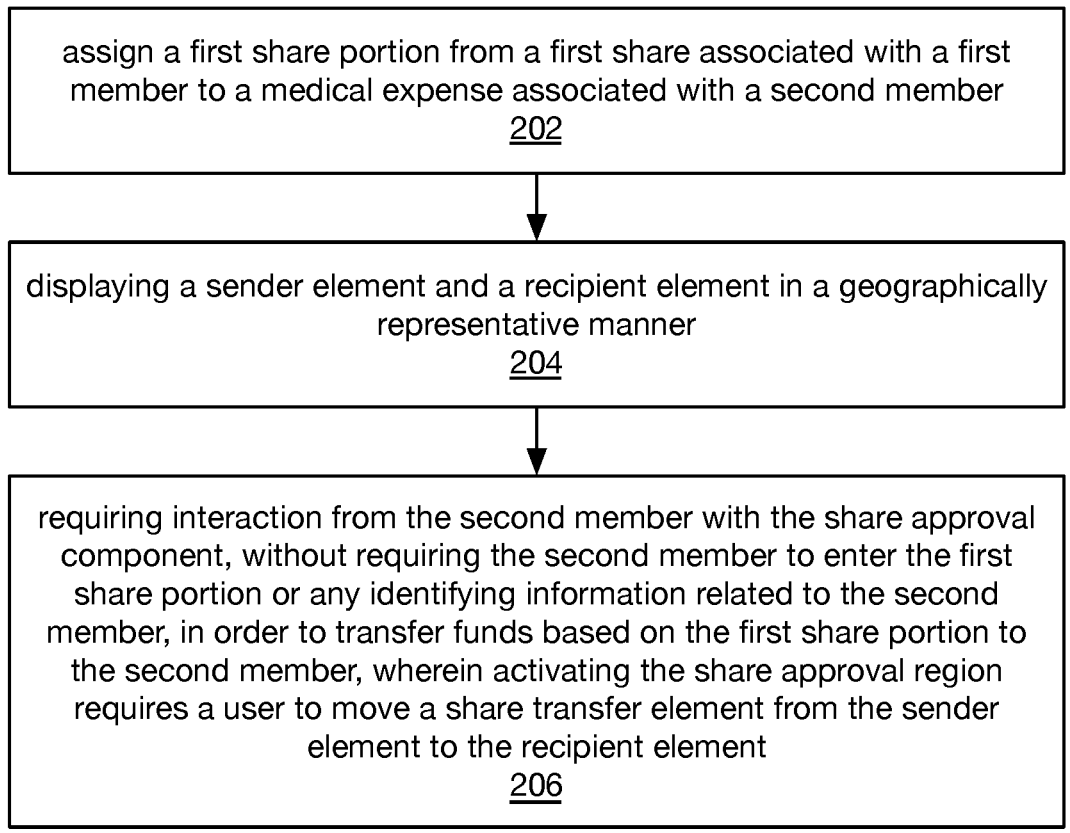
FIG. 2 is a flow chart depicting a method for a peer-to-peer direct sharing system comprising an allocation component.

The sender element and the recipient element can be displayed on the display device in a geographically representative manner, for example on a map 4 such as a map of the United States as shown in FIG. 1, and as shown in step 204 of FIG. 2. For example, the sender element 10 can be placed on a map 4 in a location generally corresponding to their physical location, home location, church location or another location affiliated with sending member. Likewise, the recipient element 12 can be placed on a map 4 in a location generally corresponding to their physical location, home location, church location or another location affiliated with receiving member. It may be preferable to place the marker element within a random set distance (for example, within a 5-, 10-, 20-, or 50-mile radius) away from the actual location of the member's location or their home. An offset distance may offer the members a sense of privacy, while effectuating a community feel based on the geographic representation. Alternatively, the sender element 10 and recipient element 12 may be placed in a geographic center of a zip code region, city, or state.

In order to activate a share transfer, a user input device 2 allows a sending member to activate a share approval component. The share approval component may be a button, text, graphic, or a share approval region 14 next to the recipient element 12, or a combination of these elements. The border of the share approval region 14 is shown by a dotted line in FIG. 1. The border of the share approval region 14 may be invisible.

Upon activation of the share approval component, a peer-to-peer transfer of funds in the amount of a first share portion is initiated. The sending member interacts with the share approval component in order to initiate the transfer of funds to the first member's virtual bill account, as shown in step 206. The allocation component provides the first share portion and identifying information related to the second member in order to transfer funds based on the first share portion to the second member. The display device 3 may display a share information section 5 containing information related to the share transfer, such as recipient name and share portion amount.

The allocation component may provide a data file to a share sending component, where the data file comprises the recipient name, the recipient account information, and the first share portion amount. The second member is not required to enter the first share portion amount or any required identifying information related to the second member in order to transfer funds based on the first share portion to the second member.

Activating a share approval component may require the sending member to move a transfer element 16 from a first position adjacent to the sender element 10 to a share approval region 14 near the recipient element 12. When the sender element and the recipient element are laid out geographically, the transfer element is moved by the sending member as if a package or envelope were being physically delivered. For example, the transfer element 16 can be moved from a position adjacent to the sender element 10 along path 18 to the share approval region 14. The sending member may release or place the transfer element within a radius around the recipient element 12 in order to trigger an approval signal to be communicated from the user input device 2 to the share sending component. Upon receipt of the approval signal by the share sending component, the transfer is initiated of the share amount from the sending member's account to the virtual bill account associated with one or more bills associated with the intended receiving member.

Figure 3:
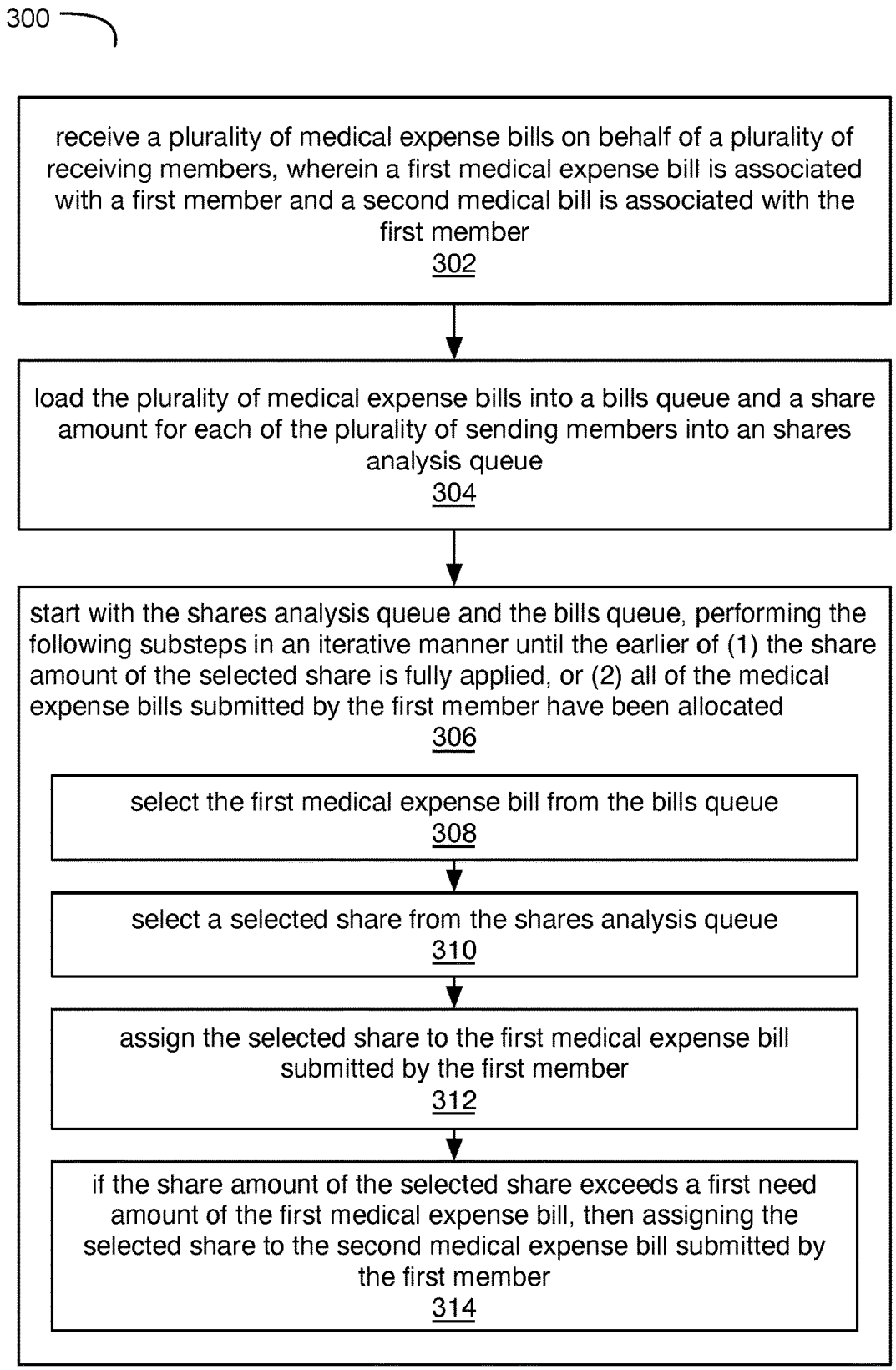
FIG. 3 is a flow chart depicting a method for a peer-to-peer direct sharing system comprising an allocation component that assigns a sending member's excess share funds to a second bill associated with the same receiving member.

In order to efficiently connect sending members and receiving members, the allocation component can be configured to match a first sending member's share with multiple bills associated with a first receiving member, according to the method shown in FIG. 3. In certain circumstances, a single bill (or the remaining portion of a single bill after a partial allocation) may be less than the periodic fixed share amount that a sending member shares under the terms of the peer-to-peer, direct sharing organization. In these cases, it may be advantageous to match a single sending member with multiple bills from the same receiving member.

A plurality of medical expense bills are received on behalf of a plurality of receiving members, according to step 302. A first medical expense bill and a second medical bill are associated with a first member. The first and second medical bills are loaded into a bills analysis queue. The allocation component loads a share amount for each of a plurality of members into a shares analysis queue. The share amount is a dollar amount. The share amount may be determined by the guidelines, with a specific dollar amount that each member or group of members is responsible to send over a specific period of time.

An iterative process proceeds, as shown in step 306, which has several substeps. The iterative process runs until the earlier of (1) the share amount of a selected share associated with a sending member is fully applied to one or more medical expense bills, or (2) all of the medical expense bills submitted by a specific receiving member have been allocated.

The iterative process involves the following substeps. According to step 308, the first medical expense bill is selected from the bills queue. According to step 310, a selected share is selected from the shares analysis queue. According to step 312, the selected share is assigned to the first medical expense bill submitted by the first member. According to step 314, if the share amount of the selected share exceeds a first need amount of the first medical expense bill, then the selected share is assigned to the second medical expense bill submitted by the first member. The first need amount can be different from the first medical expense bill due to the member responsibility portion or due to the allocation of a previous share to the first medical expense bill or due to a negotiated discount or due to a repricing calculation.

In one embodiment, the allocation engine is a set of program instructions stored on a tangible computer-accessible storage medium in non-transitory form. The allocation engine operates by selecting a selected share. The allocation engine assesses the bills from the bills queue based by sorting the bills oldest to newest and prioritizing the oldest bill that can be mostly satisfied by the selected share. For example, the mostly satisfied threshold could be at least 70%, at least 80%, or at least 90% of the need amount of a bill. The oldest bill that is the right size is then selected for allocation. If remaining share portion satisfies the bill, then the allocation engine looks for additional newer bills in the available bills database that belong to the same membership.

Since multiple family members can be grouped a single membership, this preferential membership allocation could involve paying the medical expenses of multiple individuals. In such a circumstance, one selected share can pay the medical expenses of multiple individuals within the same household. For example, a single share could be sent to pay the medical expense bill for a father's broken leg and the additional share money is sent to the same membership for a bill related to the son's seizure treatment. If the first membership doesn't have additional bills, then remaining amount of share portion is assigned to another membership.

Sending a single share to a single membership based on multiple medical expense bills may minimize the number of financial transfers to separate individuals. This method also allows the health care sharing organization to better develop the interpersonal relationship between sending member and recipient member. Using this method, members may be more relationally connected and better enabled to pray and encourage their fellow member who may be undergoing serious medical treatment or medical expenses for multiple members of their family.

Figure 4:
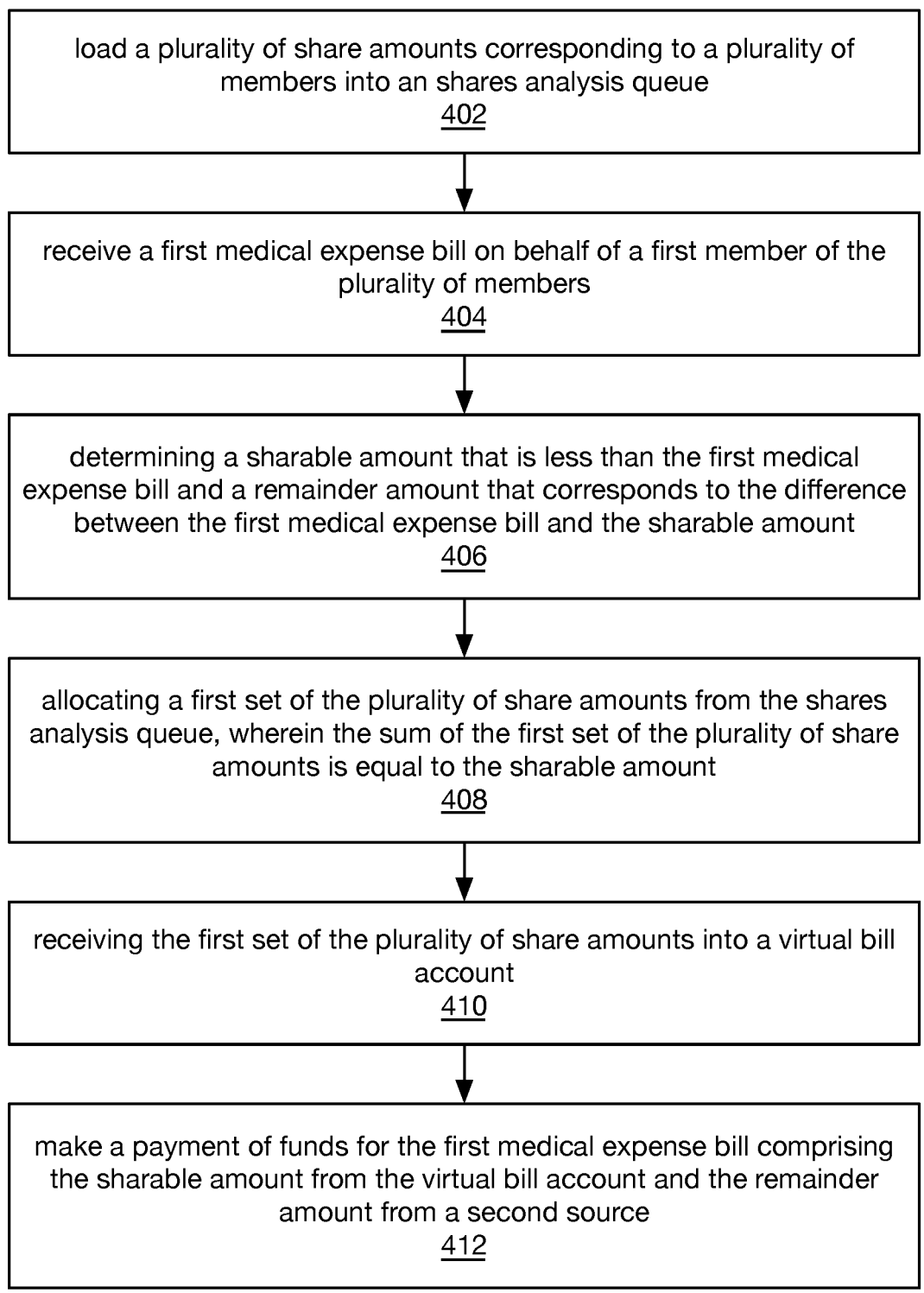
FIG. 4 is a flow chart depicting a method for a peer-to-peer direct sharing system comprising funding a bill account with funds from a plurality of sharing members and paying a medical bill using funds from the virtual bill account and funds from a second source.

When a member is responsible for a portion of the medical expense bill, the direct sharing system may offer the receiving member the option to bundle funds from sharing members with funds from a second source in order to pay the whole entire medical expense bill in a single transaction, as shown in FIG. 4. Bundling health care sharing payments gives the receiving member the ability to bundle the gifts from other members and their own contribution, and then make a single payment to the provider that resolves the outstanding balance of the bill. This constitutes a dramatic improvement in convenience and efficiency and is an improvement on the traditional payment process in health care sharing and would constitute an improvement over traditional health insurance as well.

The health care sharing organization may require or permit the receiving member to have the ability to trigger an electronic funds transfer withdrawal from their bank account for the portion of the bill that is their responsibility. These funds would then be added to their Bill Account on the virtual share exchange. The output is a single payment, made up of funds contributed by sending members, and the funds contributed by the receiving member.

The health care sharing organization loads a plurality of share amounts corresponding to a plurality of members into a shares analysis queue, according to step 402. A first medical expense bill is received by the health care sharing organization from or on behalf of a first member of the plurality of members, according to step 404. The health care sharing organization determines a sharable amount that is less than the first medical expense bill, according to its guidelines, as shown in step 406. The health care sharing organization also determines a remainder amount that corresponds to the difference between the first medical expense bill and the sharable amount. This remainder amount may be the responsibility of the first member or may be the responsibility of a third party. The first medical expense bill amount may be a repriced amount based on fair bill repricing rather than the amount billed by the provider.

The health care sharing organization allocates a first set of the plurality of share amounts from the shares analysis queue in order to help the first member pay for their first medical expense bill. The allocation component continues to assign available shares to the first member until the sum of the first set of the plurality of share amounts is equal to the sharable amount, according to step 408. The members corresponding to the first set of the plurality of share amounts that are allocated to the first member are then responsible for sending their shares to the first member. These members transfer funds from their virtual wallet account to a virtual bill account, according to step 410.

The first member is able to initiate a payment of funds for the first medical expense bill comprising the sharable amount from the virtual bill account. The funds in the virtual bill account may not equal the total amount due for the first medical expense bill if there is a member responsibility portion. In that case, the first member cannot completely satisfy their bill without contributing additional funds. In order to streamline the process of receiving payments by the medical provider, the first member may provide the remainder amount from a second source to satisfy the first medical expense bill with a single payment, according to step 412.

In one embodiment, the allocation component selects a member's wallet. The allocation component assigns a share amount from the member's wallet to an oldest unmet bill in a bills payable database. Bill information can be stored in a bills payable database such as Mphasis™ Javelina™, which operates to receive bill information. A network connection is provided between the allocation component and the bills payable database. Upon request, upon initiation from another source, or according to a schedule, the bills payable database sends certain information from the bills payable database to the allocation component. The allocation component receives certain information from the bills payable database, which may include bill identification number, membership identification number, remaining bill amount required by the recipient member, and date the bill was created to determine age. The allocation component may also receive a date billed or a date that the bill was received by the health care sharing organization. In an alternative embodiment, the allocation component and the bills payable database are part of the same computer system.

The allocation component also receives information from a wallets-available database related to the availability of funds associated with members of the health care sharing organization. The wallets-available database may include the membership identification number, the wallet balance (a numeric value for the currency (dollars) that the membership has available in their virtual account for sharing), and the member's share schedule. The allocation component may receive upon request, upon initiation from another source, or according to a schedule the following data: membership identification number, current wallet balance, and the member's share schedule.

The member's share schedule may be used when a plurality of members share during different weeks of the month. For example, a first set of members are designated for allocation and sharing in the first week of the month. A separate set of members are designated for allocation and sharing in a second week of the month. In this way, members who submit a bill for payment do not have to wait until a monthly allocation cycle date. The recipient member can receive assistance from other members based on the weekly allocation.

The allocation component can be configured to prevent matching a sending member with a receiving member if a medical expense bill is being shared for a second time due to a failure to receive a share and the sending member has failed to send a share payment in a timely fashion. By requiring member interaction in order to send the share, there is the chance that a sending member will fail to timely send the share. In order to prevent a situation where a particular receiving member experiences repeated failures receiving a share, the health care sharing organization can track how timely a sending member sends their shares. For example, the sending member may have a 24-, 48-, 72-, 120-, or 168-hour window to approve the sending of their share. If the sending member fails to send their share within the selected window of time, then the sending member's share is not allocated to a receiving member whose need is being reallocated because of a failure to receive a timely payment. The health care sharing organization may also prioritize the sharing of a member's medical expense bill for those members who have consistently sent their share within the selected window.

The health care sharing organization can assign sharing speed rankings to members. The health care sharing organization may incentivize rapid sharing by preferentially matching members who have a history of rapidly completing the member interaction requirement to initiate the transfer approval. Members with fast sharing speed rankings may be preferentially matched with a member who had a need that went partially unpaid from a previous allocation in order to get the receiving member's bill paid as soon as possible. The display device may also be configured to show the sending member their sharing speed rankings or a sharing speed rate. This gamification of sharing may incentivize rapid sharing, adding another fun and personalized feature to further improve peer-to-peer sharing.

The allocation component may perform a pre-calculation to determine the ability of the members to assist with the submitted needs. The allocation component can take a sum of bill amounts due from the bills payable database and compare the amount with the sum of the wallet balance from the wallets-available database. A percent is calculated based on the sum of all of the wallets balance for the membership needed to pay all of the bills in the Bills Payable database at the fair billing price. For example, if the sum of the Bills Amount Due was $80,000 and the sum of the Wallets Balance is $100,000, then the wallet portion percentage for this exemplary period would be 80%. 80% of each wallet is then assigned to bills from the bills payable database.

If the sum of bills amount due exceeds the sum of the Wallets Balance, then the allocation engine proceeds to assign wallet amounts to bills until there is no additional balance in any of the virtual wallet accounts. The remaining bills would be shared in the next allocation cycle in a subsequent period. Those bills may then be prioritized as an oldest bill to expedite sharing. The member's automatic funding amount for their wallet may be increased when bills are not funded for multiple allocation cycles.

The allocation component tracks an assignment of membership shares, for example, member 0001 to member 0002 for bill 0003. Each assignment may have a unique assignment identification number. The member interaction to generate a transfer approval signal (as discussed below) may be associated with unique assignment identification number. The allocation component also tracks share portion amount. For example, a share portion amount for a particular assignment identification number may be $100 for a month. This is the amount of money that the sending member gives to other members. The allocation component creates a series of assignments. Each assignment identification represents a potential funds transfer from a first membership wallet to a bill associated with a second membership. The member interaction event that generates the transfer approval signal may be associated with multiple assignment identification numbers.

In order to fund the virtual wallet accounts with a wallet balance, the member may set up an automatic electronic funds transfer into the virtual account with a predetermined contribution amount on a regular cycle. The predetermined contribution amount can depend on family size, average age of the members of the household, maximum age of a member of the household, location, income, employment status, health metrics, and determination of qualification for charitable assistance.

In addition to sending funds from the virtual wallet account to assist with another member's medical care, the member may send funds from the member's virtual wallet account for administrative overhead to the health care sharing organization.

Funds that are not shared with another member or designated for administrative overhead can be built up for the member to share during a subsequent allocation. In this way, the member builds up a savings account that is available for that member to increase the capacity of the health care sharing organization to administer sharing to other members.

In order for a sending member to send a share, the health care sharing organization may require member interaction. One example of member interaction is swiping an icon to share, called Swipe-to-Share™ sending method. Sharing ministries allow a member to share in the needs of another member, specifically to help with the costs of receiving health care.

One advantage to health care sharing ministries over a health insurance company is the personal community connection. Traditionally, that community connection has been accomplished by personal letters expressing sympathy and prayers being sent along with a physical check to the receiving member. Automated electronic payments may be appealing to members because the automated electronic payment can be accomplished quickly, without much thought, and without a postage stamp. Requiring member interaction to initiate an electronic payment through a digital user interface provides a member experience that is simple and efficient as well as being personal and purposeful.

All fields may be determined during the allocation process and pre-populated into a mobile application as presented to the user via a display device. Fields may include recipient's name, receiving account information, and share portion amount. The recipient's location may be the street address, zip code, state, or other location identifying information. Non-Required fields may include prayer request from recipient and a field for response from sender. Another non-required field may include the recipient's profile picture.

The sending member may receive a notice from the mobile application that the share is ready for sending. The notification may be through email, popup, text message, sound alert, or the appearance of a symbol or logo. In order to emphasize the personal connection, a sender element and recipient element may be graphically displayed on a map.

The sending member may initiate sending the item to the recipient by moving a visual transfer element from the sender element to the recipient element. The transfer element represents the funds being transferred from the sending member's virtual wallet account to the recipient's wallet. The sender may then be prompted to pray for and write a note of encouragement to the recipient. Completion of the member interaction triggers a transfer approval signal. The user input device may send the transfer approval signal. Upon receipt of the transfer approval signal, the health care sharing organization or a partner transfers funds from the sending member's virtual wallet account to the receiving member's virtual bill account. The money in the virtual bill account is available to the receiving member to pay the medical bills. The member application can be as simple as an interactive button. Alternatively, the member interaction can be a swipe-to-share interaction with a user input device by the member with the transfer element as displayed on a display device. In this case, the member is able to physically use his or her finger to move the transfer element from the sender element to the recipient element, making the transfer a purposeful and intentional act of giving. The recipient sees that someone has sent money to them and they also receive an optional encouragement from the sender.

During allocation, a single sending member may have their share portion assigned to multiple bills. A primary recipient member may be identified. A primary recipient may be determined by the health care sharing organization as a minimum threshold for sharing with another member. For example, the health care sharing organization may determine that each member must share at least 65%, 75%, 80%, or 90% of their total share amount to a primary recipient. The primary recipient is displayed as the recipient member on the display device. And the prayer request is associated with that recipient member. In order to send all of the share portion to other members, the remainder portion of the share may be associated with a secondary recipient member. The display device may not display the secondary recipient. Alternatively, information related to a secondary recipient may be accounted for in a detailed accounting window.

A virtual wallet account may also be associated with the health care sharing organization, rather than an individual member, to facilitate certain sharing events. This virtual wallet account associated with the health care sharing organization may be referred to as a super member wallet. A bill may also be associated with the health care sharing organization, rather than an individual member, and be referred to as a super bill.

The super bill and super member wallet may be used to facilitate certain sharing events. For example, when multiple members are contributing to a bill, especially a larger bill, there is a chance that one or more assigned sending members will fail to initiate the sending of their share portion for a given period. This failure leaves the recipient member with an only partially funded virtual bill account.

Memberships who fail to initiate the sending of their share portion for a given period prior to a due date may be put into probation. Share portions from memberships in probation may be assigned to a probation bill, a type of super bill. The probation bill is not associated with a recipient member. The probation bill allows for the creation of a member funded account from members who missed one or more deadlines for sharing with an assigned recipient member. The funds paid toward the probation bill are transferred to a probationers' wallet, a type of super member wallet that is a virtual account controlled by the administrator of the sharing organization rather than an individual member. The probationers' wallet becomes available for a subsequent allocation. The probationers' wallet can be prioritized as a first share portion for rapid distribution to satisfy oldest bills. Funds from the probationers' wallet may be transferred automatically, without delay, since those funds are subject to probation rules and not otherwise restricted to be released upon a member interaction. By matching the funds from the probationers' wallet with oldest bills, bills that were not fully funded during a previous cycle are most quickly funded.

The super member wallet may also be used to process refunds from providers. Medical billing often involves negotiated discounts. It is possible that a virtual bill account can be over funded when a negotiated price is lower than the calculated fair billing price. In some circumstances, the excess funds can be directed from the virtual bill account to a super member wallet to make the funds available to members during a subsequent allocation cycle.

The allocation component can be configured to work with the super member and super bill. The allocation component can be run in multiple stages. For example, the super member wallet can be funded in a first allocation cycle from those members who are assigned to probation. In this example, all probationer's wallet share amounts are assigned to the super member wallet. In the next allocation phase, the funds from the super member wallet are allocated to priority medical expense bills. Priority medical expense bills can include bills where the receiving member did not receive all allocated shares during a previous allocation. Priority medical expense bills may also include bills that have received discounts based on early or timely payment. If the super member wallet has insufficient funds to provide for all of the priority medical expense bills, then the allocation engine may also prioritize allocating member wallet amounts from the members having the fastest speed sharing ratings. A third round of allocation involves regular member wallets (non-special member wallets) being allocated to regular bills (non-priority medical expense bills).

While reference is made to receiving or recipient members, in one embodiment of the health care sharing organization each member shares with another, even the recipient or receiving member. Also, as used in this disclosure, health care sharing ministries are considered the same as references to health care sharing organizations.

Figure 5:
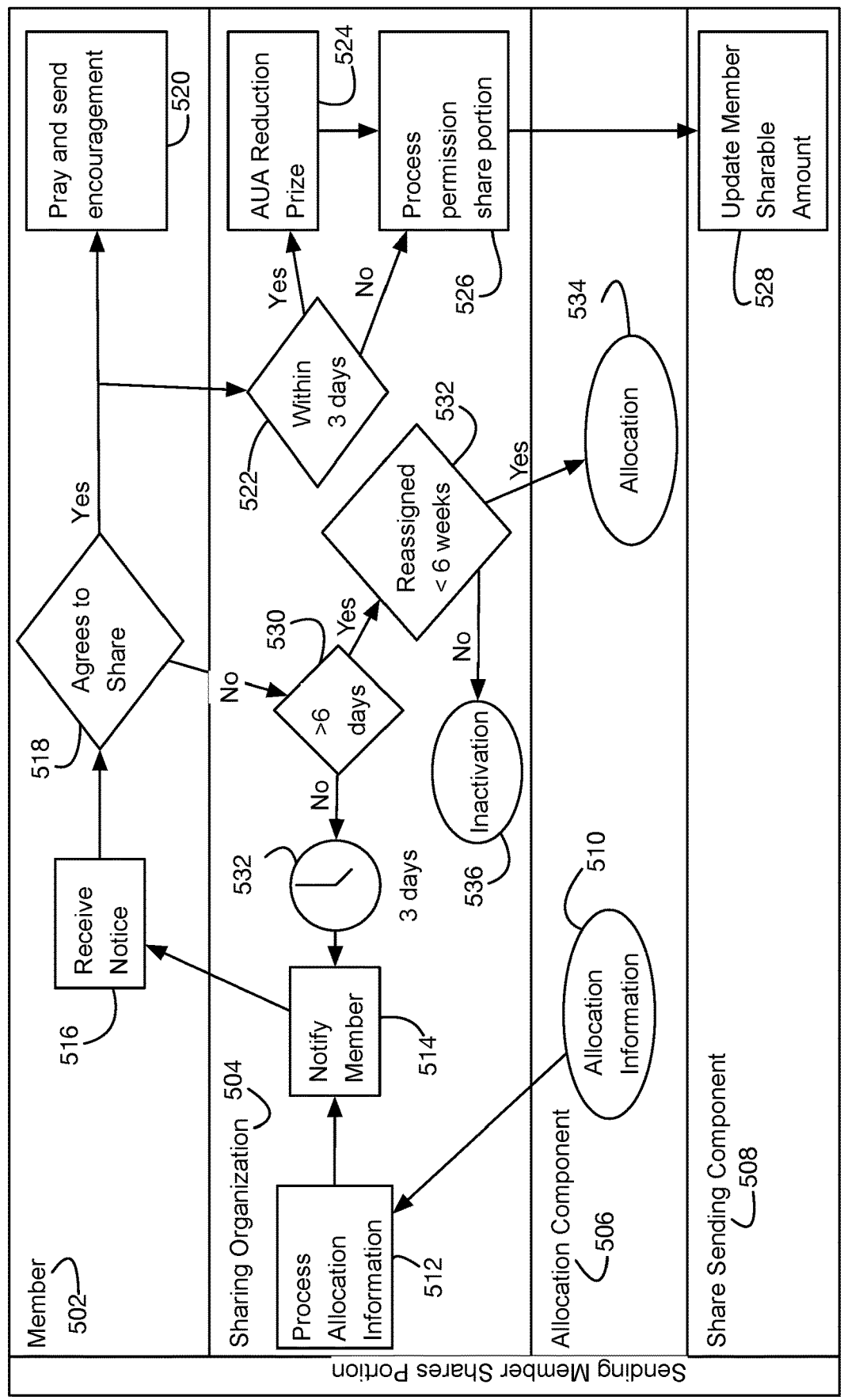
FIG. 5 is a schematic workflow for managing the assignment of shares and payment of medical bills for members of a peer-to-peer direct sharing system.

The operation of sending member shares portions can be divided between the members 502, the sharing organization 504, an allocation engine 506, and a communication portal 508, as shown in FIG. 5. The allocation provides certain allocation information 510 to the sharing organization 504. The allocation information 510 may include a sending member identification number, a receiving member identification number, a bill identification number, a unique assignment identification number, a share portion amount, a sharing speed ranking, and a sharing speed rate. The sharing organization processes the allocation information, according to step 512. Members are notified according to step 514. The member receives the notice, according to step 516. The notification can be received through the communication portal 508 or through a variety of notification methods. The member is prompted to agree to sharing, according to step 518, such as using the Swipe-to-Share™ sending method described above. If the member agrees to send the share, then the member is prompted to pray for and send a message of encouragement to the receiving member, according to step 520. The Sharing Organization receives an approval signal. If the sending member agrees to send share within 3 days, according to step 522, then the member may receive a reward, according to step 524. For example, the member may be notified that their sharing speed ranking has improved. In another example, the sending member's annual unshared amount may be reduced as a reward for rapid sharing. If the member fails to agree to share within 3 days (or some other time frame), then the member is not entitled to the reward of step 524. In either case, the sharing organization processes permission and transfers the share portion funds, according to step 526. The member wallet amount is updated through the communication portal 508. The member sharable amount is also updated, such as by updating the virtual bill account to reflect the receipt of funds which can be displayed through the communication portal 508 to the receiving member, according to step 528.

The sending member may not agree to share at step 518. When the sending member has failed to agree to send the share for more than 3 days (or other time based on time gate 530) or less than 6 days (or other time based on time gate 532), then the member is notified, according to step 514. If the member has failed to agree to a share for greater than 6 days, then the member is reassigned another member to share with according to step 534 as long as the sending member reassignment is less than 6 weeks (or other time based on time gate 532). If the sending member has failed to send a share for greater than 6 weeks (or other time based on time gate 532), then the sending member is inactivated, according to step 536.

Figure 6:
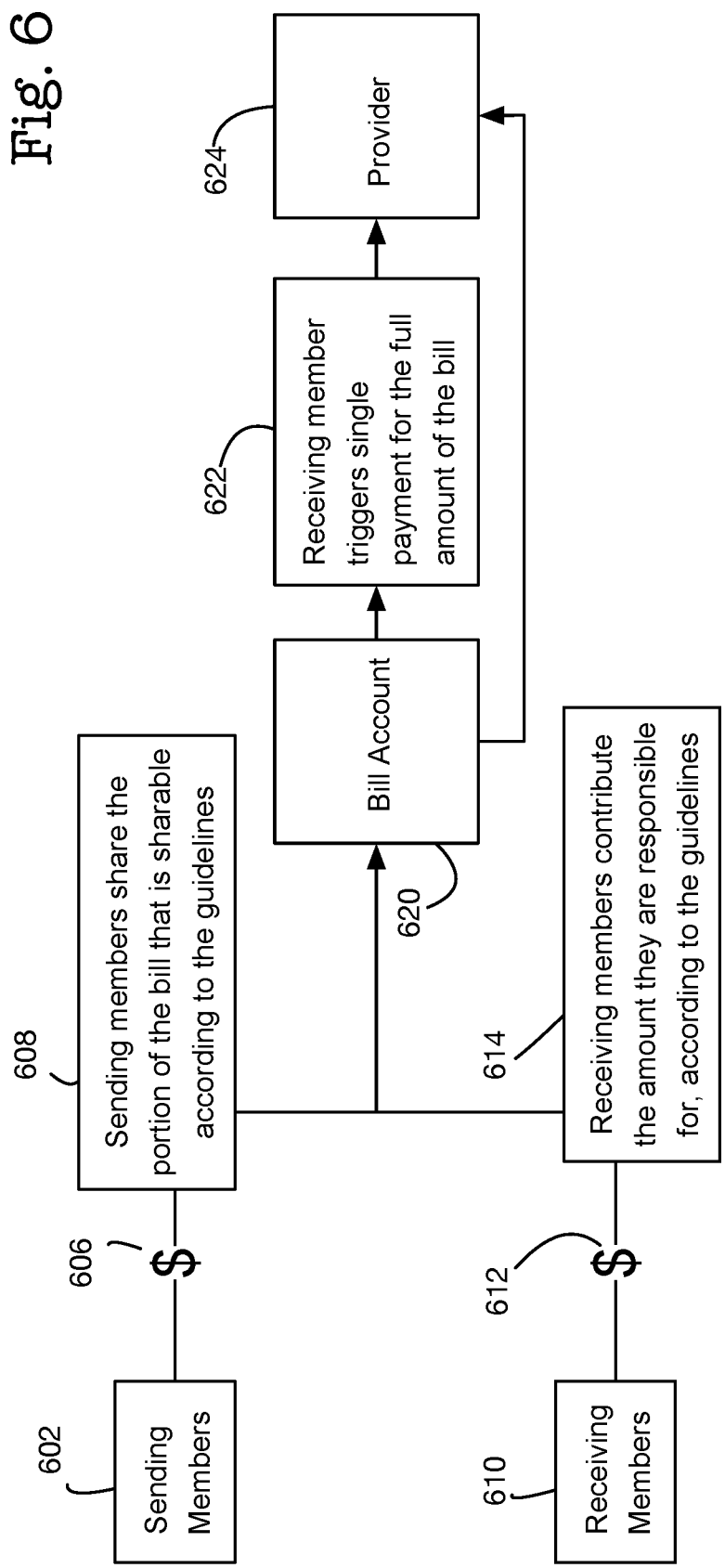
FIG. 6 is a flow chart depicting a method for a peer-to-peer direct sharing system comprising funding a bill account with funds from a plurality of sharing members and paying a medical bill using funds from the bill account and funds from a receiving member.

The first share portion can be collected into a bill account, such as a virtual bill account. The virtual bill account funding is shown in flow chart form in FIG. 6. The sending members 602 who have been assigned to send shares send their funds 606. The sending members share the portion of the bill that is sharable according to the guidelines, according to step 608, and as determined by the allocation step. Once all of the sending members have completed the share sending process, then the virtual bill account is funded with the total shared amount, step 622. The receiving members 610 may also contribute funds 612 to the virtual bill account in the amount they are responsible for, according to the guidelines and step 614.

Receiving members 610 make a payment of funds 612 for the first medical expense bill to bill account 620. The amount of funds 612 from the plurality of receiving members 610 corresponds to the total sharable amount. The payment of funds from the bill account 620 to the provider 624 can depend on the receiving member triggering a single payment for the full amount of the bill, according to step 622. The step of making a payment of funds can also occur without member interaction after a predetermined period of time after a threshold amount of the funds are received into the bill account 620. For example, the payment can be initiated when the plurality of share amounts received from sending members 602 are received into the virtual bill account, the provider payment can be triggered to be sent. In this situation, the receiving member may be responsible to make a payment of funds from the bill account 620 and the remainder amount from a second source. The second source may be a bank account from which the receiving member has authority to initiate an electronic funds withdrawal. The bill account 620 may be owned by the first member. In another example, the payment can be initiated when the plurality of share amounts received from sending members 602 are received into the bill account 620 and the amount that the receiving member is responsible to contribute is received into the bill account 620, then the provider payment can be triggered to be sent. Upon fully funding the bill account, the payment of the funds from the bill account 620 to the provider 624 may be delayed for a predetermined amount of time. The user interface or the sharing program may allow the receiving member to prevent the payment of funds within that period of time.

Figure 7:
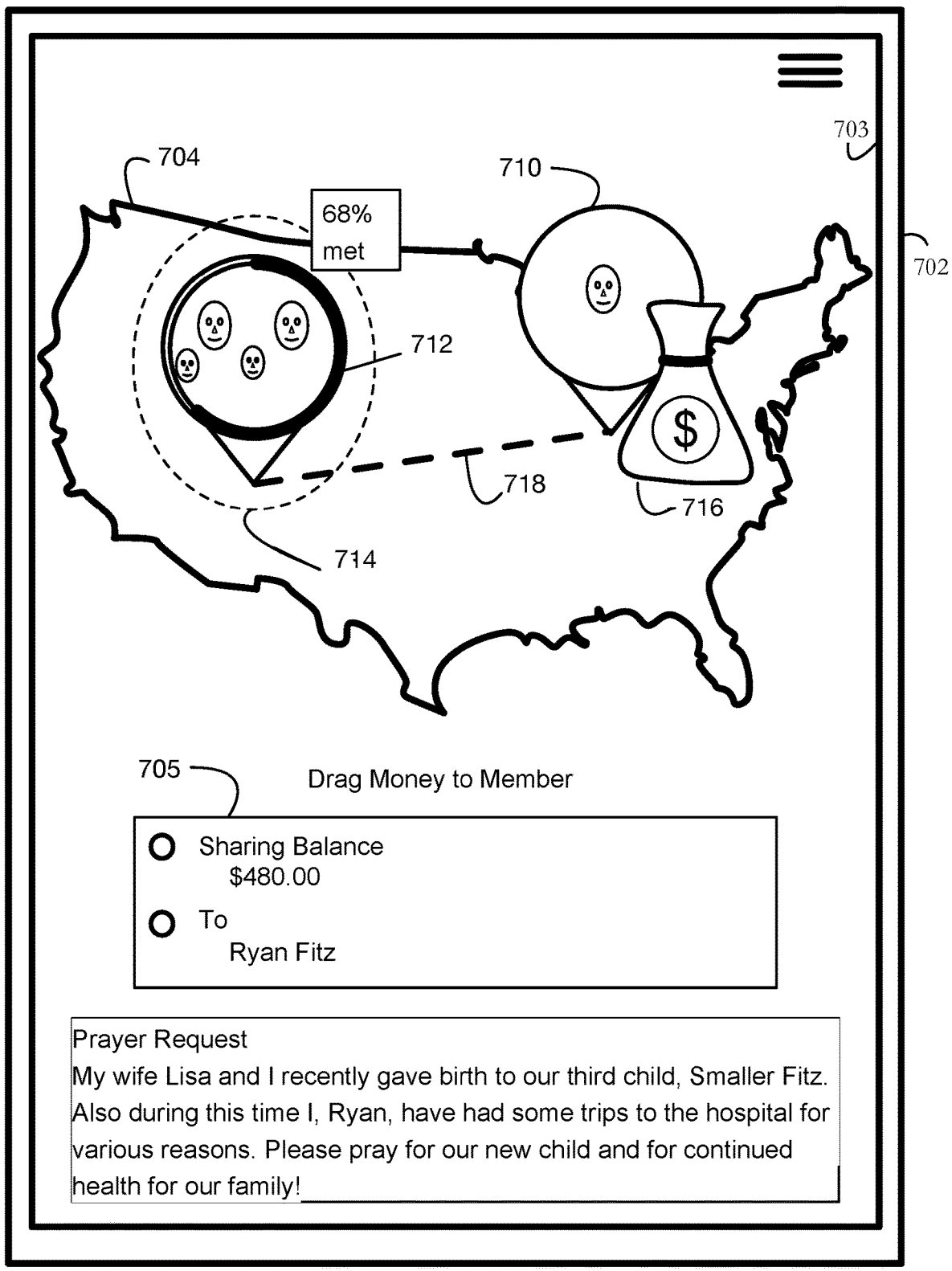
FIG. 7 depicts an example of a display device and user interface for sharing funds related to a medical expense between members of a peer-to-peer, direct share health care sharing ministry.

FIG. 7 shows a second example interface for a user, such as a member, to interact with a health care sharing community. A user input device 702 having a display 703 displays a sender element 710 and a recipient element 712. The sender element 710 and the recipient element 712 are shown as a personalized image of the respective member, including the individuals of the member. The sender element and the recipient element can be displayed on the display device in a geographically representative manner, for example on a map 704 such as a map of the United States. For example, the sender element 710 can be placed on a map 704 in a location generally corresponding to their physical location, home location, church location or another location affiliated with sending member. Likewise, the recipient element 712 can be placed on a map 704 in a location generally corresponding to their physical location, home location, church location or another location affiliated with receiving member.

In order to approve a share transfer, the user input device 702 allows a sending member to activate a share approval component. The share approval component may be a button, text, graphic, or a share approval region 714 next to the recipient element 712, or a combination of these elements. The border of the share approval region 714 is shown by a dotted line. The border of the share approval region 714 may be invisible.

The display device 3 may display a share information section 705 containing information related to the share transfer, such as recipient name and share portion amount. The display 703 may display a prayer request related to the medical expense.

Activating a share approval component may require the sending member to move a transfer element 716 from a first position adjacent to the sender element 710 to a share approval region 714 near the recipient element 712. When the sender element and the recipient element are laid out geographically, the transfer element is moved by the sending member as if a package or envelope was being physically delivered. For example, the transfer element 716 can be moved from a position adjacent to the sender element 710 along path 718 to the share approval region 714. The sending member may release or place the transfer element within a radius around the recipient element 712 in order to trigger an approval signal to be communicated from the user input device 702 to the sharing organization.

It is understood that the invention is not confined to the particular construction and arrangement of parts herein described. That although the drawings and specification set forth a preferred embodiment, and although specific terms are employed, they are used in a description sense only and embody all such forms as come within the scope of the following claims.

The present disclosure is not to be limited in terms of the particular embodiments described in this application, which are intended as illustrations of various aspects. Many modifications and variations can be made without departing from its spirit and scope. Functionally equivalent methods and apparatuses within the scope of the disclosure, in addition to those enumerated herein, are possible from the foregoing descriptions. Such modifications and variations are intended to fall within the scope of the appended claims.

Generally, a computer-accessible medium may include any tangible or non-transitory storage media or memory media such as electronic, magnetic, or optical media—e.g., non-volatile memory chip, disk or compact disc (CD)/digital versatile disc-read only memory (DVD-ROM) coupled to computer system via bus. The terms "tangible" and "non-transitory" are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer-readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

For the convenience of the reader, the above description has focused on a representative sample of all possible embodiments, a sample that teaches the principles of the invention and conveys the best mode contemplated for carrying it out. Throughout this application and its associated file history, when the term "invention" is used, it refers to the entire collection of ideas and principles described; in contrast, the formal definition of the exclusive protected property right is set forth in the claims. The description has not attempted to exhaustively enumerate all possible variations. Other undescribed variations or modifications may be possible. Where multiple alternative embodiments are described, in many cases it will be possible to combine elements of different embodiments, or to combine elements of the embodiments described here with other modifications or variations that are not expressly described. A list of items does not imply that any or all of the items are mutually exclusive, nor that any or all of the items are comprehensive of any category, unless expressly specified otherwise. In many cases, one feature or group of features may be used separately from the entire apparatus or methods described. Many of those undescribed variations and modifications are within the literal scope of the following claims, and others are equivalent.

We claim:

1. A computer-implemented control system for processing peer-to-peer direct sharing of expenses between members of a sharing organization comprising:
　a first computing device configured to:
　　load a plurality of received bills into a bills database;
　　select a first member share amount from a member share database, where the first member share amount is associated with and is to be paid by the first member a first member of the sharing organization;
　　assign a first portion of the selected first member share amount to a first received bill, from the bills database, associated with a second member of the sharing organization;
　　provide the assigned first portion with a first assignment identification number;
　a user computing device comprising a display device and configured to:
　　display a geographic representation of an actual geographic area on the display device;
　　display a sending element within the displayed geographic representation in a location-specific manner corresponding to a physical location associated with the first member;
　　display a recipient element within the displayed geographic representation in a location-specific manner corresponding to a physical location associated with the second member associated with the first assignment identification number;
　　display a transfer element on the display device initially positioned near the sending element within the displayed geographic representation in a location-specific manner corresponding to a physical location associated with the first member; and
　　trigger a first member share payment approval signal associated with the first assignment identification number by movement of the transfer element on the display device, by a user interaction, to a position on the display device near the recipient element.

2. The computer-implemented control system of claim 1, wherein the first computing device is further configured to:
　assign a second portion of the selected first member share amount to a second received bill, from the bills database, associated with the second member when the selected first member share amount exceeds an amount of the first received bill; and
　provide the assigned second portion with a second assignment identification number.

3. The computer-implemented control system of claim 2, wherein first member share payment approval signal is also associated with the second assignment identification number.

4. The computer-implemented control system of claim 1, wherein the location of the recipient element displayed on the display device is set at an offset distance on the display device corresponding to an actual geographic distance of between a 5-mile radius and a 50-mile radius from the physical location associated with the second member.

5. The computer-implemented control system of claim 1, wherein the location of the recipient element displayed on the display device corresponds to the center of a geographic region representing a zip code associated with the second member.

6. The computer-implemented control system of claim 1, wherein the location of the recipient element displayed on the display device corresponds to the center of a state associated with the physical location of the second member.

7. The computer-implemented control system of claim 1, wherein the first member share approval signal is transmitted without the user entering identifying information related to the first member share amount, the first portion, the first received bill, or the second member.

8. The computer-implemented control system of claim 1 wherein location information related to the recipient element displayed on the display device is provided to the user computing device by the first computing device.

9. The computer-implemented control system of claim 1, wherein the user computing device is further configured to:
　display a sharing speed rate on the display device based on a time taken by the user to generate the first member share payment approval signal.

10. The computer-implemented control system of claim 1, wherein the first computing device is further configured to:
　select the first received bill from the bills database that is the oldest bill in the bills database.

11. The computer-implemented control system of claim 10 wherein the first computing device is further configured to:
　select the first received bill from the bills database that is associated with a member of the sharing organization that generated a member share payment approval signal within a selected window of time.

12. The computer-implemented control system of claim 10, wherein the first computing device is further configured to:
　select the first received bill from the bills database that is associated with a member of the sharing organization having a fastest sharing speed rate.

13. The computer-implemented control system of claim 1, wherein the first computing device is further configured to:
　assign a third member share amount to a third member of the sharing organization to the first received bill, from the bills database, if the first member fails to generate the first member share payment approval signal within a selected window of time.

14. The computer-implemented control system of claim 13, wherein the third member has a fastest sharing speed rate.

15. The computer-implemented control system of claim 1, wherein an amount of the assigned first portion is at least 65% of an amount of the first received bill.

\* \* \* \* \*